(12) United States Patent
Van Der Zee et al.

(10) Patent No.: US 10,718,314 B2
(45) Date of Patent: Jul. 21, 2020

(54) MODULAR TRANSPORTATION AND STORAGE SYSTEM FOR A WIND TURBINE ROTOR BLADE

(71) Applicant: LM WP PATENT HOLDING A/S, Kolding (DK)

(72) Inventors: Jacobus Van Der Zee, Kolding (DK); Anne Rothe Hakansson, Lunderskov (DK)

(73) Assignee: LM WP PATENT HOLDING A/S, Kolding (DK)

(*) Notice: Subject to any disclaimer, the term of this patent is extended or adjusted under 35 U.S.C. 154(b) by 173 days.

(21) Appl. No.: 15/565,278

(22) PCT Filed: Apr. 11, 2016

(86) PCT No.: PCT/EP2016/057919
§ 371 (c)(1),
(2) Date: Oct. 9, 2017

(87) PCT Pub. No.: WO2016/162562
PCT Pub. Date: Oct. 13, 2016

(65) Prior Publication Data
US 2018/0073488 A1 Mar. 15, 2018

(30) Foreign Application Priority Data
Apr. 9, 2015 (EP) ..................... 15162980

(51) Int. Cl.
*F03D 13/40* (2016.01)
*B60P 3/40* (2006.01)
(Continued)

(52) U.S. Cl.
CPC ............... *F03D 13/40* (2016.05); *B60P 3/40* (2013.01); *B60P 7/0823* (2013.01);
(Continued)

(58) Field of Classification Search
CPC ...... F03D 13/40; F03D 1/0675; B60P 7/0823; B60P 3/40; Y02E 10/721; F05B 2260/02
See application file for complete search history.

(56) References Cited

U.S. PATENT DOCUMENTS 8,439,602 B1 * 5/2013 Suazo ........................ E02B 5/02
405/118
8,672,131 B2 * 3/2014 Nogueira ............... B65D 85/68
206/521
(Continued)

FOREIGN PATENT DOCUMENTS

DK 177850 B1 9/2014
EP 1813473 A2 8/2007
(Continued)

*Primary Examiner* — Ko H Chan
(74) *Attorney, Agent, or Firm* — Nath, Goldberg & Meyer; Jerald L. Meyer; Tanya E. Harkins

(57) ABSTRACT

The present invention relates to a modular transportation and storage system for a wind turbine rotor blade comprising a first and a second tip end receptacle (112, 160) for supporting the blade, a tip end frame (111) for receiving any of the first and second tip end receptacles, wherein the first tip end receptacle (112) is adapted for supporting the blade (10) in a substantially vertical position, and wherein the second tip end receptacle (160) is adapted for supporting the blade in a substantially horizontal position.

19 Claims, 6 Drawing Sheets

Figure 1:
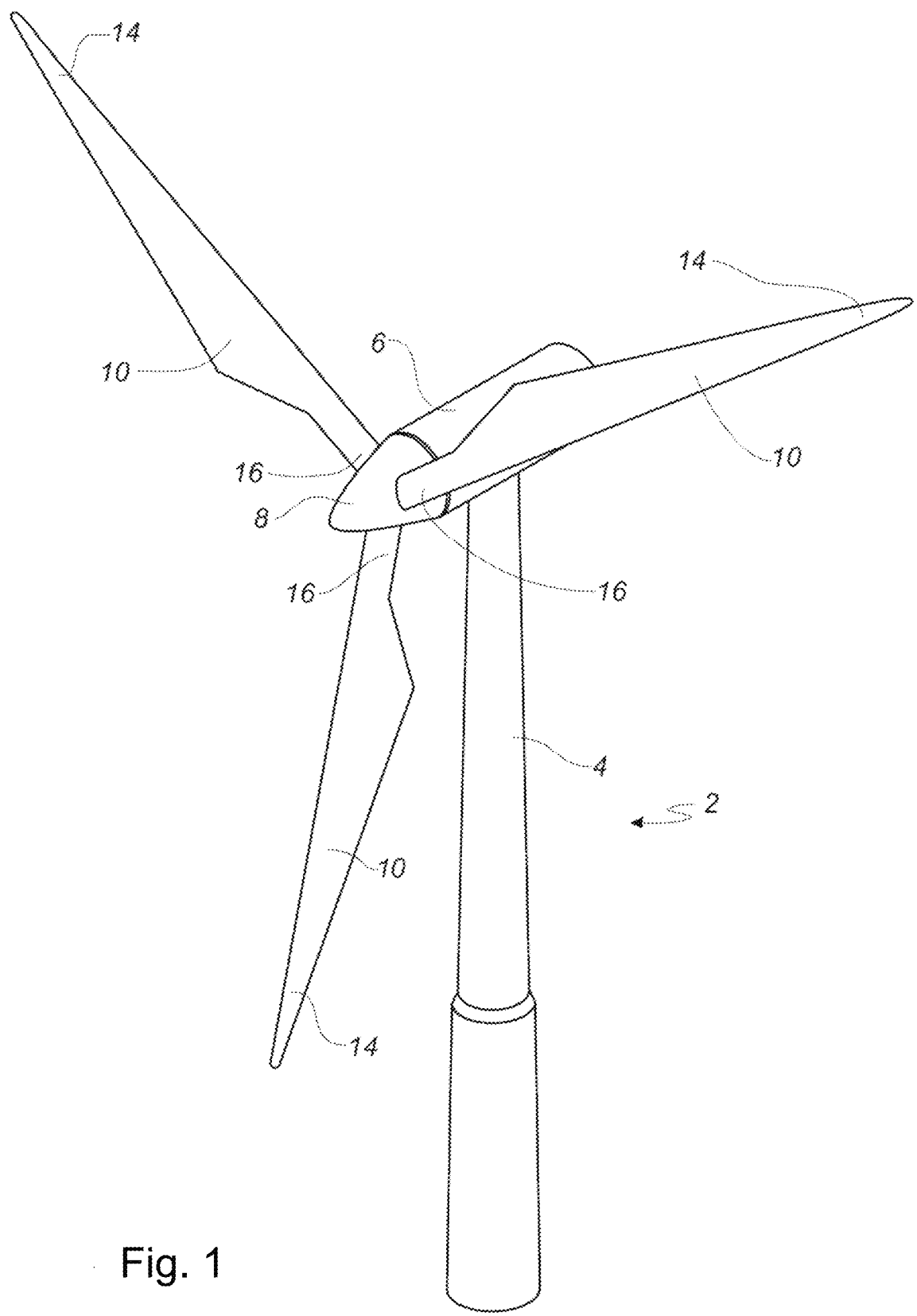

(51) Int. Cl.
    *B60P 7/08*        (2006.01)
    *F03D 1/06*        (2006.01)

(52) U.S. Cl.
    CPC ........ *F03D 1/0675* (2013.01); *F05B 2260/02* (2013.01); *Y02E 10/721* (2013.01)

(56) References Cited

U.S. PATENT DOCUMENTS

| | | | | |
|---|---|---|---|---|
| 8,967,929 | B2* | 3/2015 | Frederiksen | B60P 3/40 410/44 |
| 9,297,135 | B2* | 3/2016 | Suazo | E02B 3/12 |
| 9,429,139 | B2* | 8/2016 | Johnson | B60P 3/40 |
| 10,132,070 | B2* | 11/2018 | Madler | E03F 5/046 |
| 2007/0177954 | A1* | 8/2007 | Kootstra | B60P 3/40 410/44 |
| 2012/0091080 | A1* | 4/2012 | Kelly | B60P 3/40 211/60.1 |
| 2014/0314576 | A1* | 10/2014 | Lieberknecht | F03D 13/40 416/220 R |
| 2016/0290322 | A1* | 10/2016 | Cuoghi | F03D 1/0675 |

FOREIGN PATENT DOCUMENTS

| | | |
|---|---|---|
| EP | 2418376 A1 | 2/2012 |
| EP | 2708731 A2 | 3/2014 |
| WO | 2010125424 A1 | 11/2010 |

\* cited by examiner

MODULAR TRANSPORTATION AND STORAGE SYSTEM FOR A WIND TURBINE ROTOR BLADE

This is a National Phase Application filed under 35 U.S.C. 371 as a national stage of PCT/EP2016/057919, filed Apr. 11, 2016, an application claiming the benefit of European Application No. 15162980.5, filed Apr. 9, 2015, the content of each of which is hereby incorporated by reference in its entirety.

FIELD OF THE INVENTION

The present invention relates to a modular transportation and storage system for a wind turbine rotor blade.

BACKGROUND OF THE INVENTION

Wind turbine blades used for horizontal axis wind turbines for generating electrical power from wind can be rather large and may exceed 70 metres in length and 4 metres in width. The blades are typically made from a fibre-reinforced polymer material and comprise an upwind shell part and a downwind shell part.

Often, transporting wind turbine blades from the production facility to the site of wind turbine or the wind turbine power plant requires many transportation steps. Typically, the blades are transported by truck, train or ship and again by truck to the site of the wind power plant. Additionally, reloading between the different types of transportation is needed. Finally, the blades are stored at the production facility and at the site of the wind turbine power plant.

Due to the size and fragility of these large rotor blades, the blades may be damaged during transport as well as during loading and unloading. Such damages may seriously degrade the performance of the blades. Therefore, the blades need to be carefully packaged in order to ensure that they are not damaged.

However, due to the increasing length of modern wind turbine blades, it is gradually becoming more complicated and expensive to transport the blades. It is not uncommon that the transportation costs amount to 20 percent or even higher of the total costs for manufacturing, transporting and mounting the wind turbine blade on the rotor of a wind turbine blade. In addition, some blades are transported to the erection site through different modes of transport, such as by truck, train and ship. Some of these modes of transports may have restrictions on large loads, maximum heights, maximum widths, maximum distances between transport frames or supports, for instance dictated by local regulations. Therefore, there exists a logistic problem of providing transport solutions that are suitable for various types of transport.

Overall, there is a demand for making transport solutions simpler, safer and cheaper. In particular, there is a demand for making such systems more flexible such that adaption to a certain transportation situation is possible. This applies for example for shifting from land transport to sea transport. While height restrictions require lowest possible inter-blade spacings, sea transport may require an increased inter-blade spacing to avoid contact between blades during sea disturbance.

The prior art shows various solutions for transporting more than one rotor blade using a single container or other packaging system, which is an obvious way to reduce the transport costs. However, the afore-mentioned restrictions and limits may increase the difficulty of transporting a plurality of blades using the same packaging system. There is also a need to vary the spatial orientation of blades during transport or prior to transport depending on differences in the dimensions of the blades.

WO 2012/019895 discloses a transportation and storage system for wind turbine blades with a tip end frame assembly and a root end frame assembly. The tip end frame assembly comprises a frame and a tip end receptacle received in the frame. When placed in the tip end receptacle the chord of the blade forms an acute angle with vertical.

WO 2014/064247 describes a transportation and storage system for at least two wind turbine blades. The system is adapted to stack the blades in an alternating root end to tip end arrangement. The tip end of the second wind turbine blade may extend beyond the root end of the first wind turbine blade, and the tip end of the first wind turbine blade may extend beyond the root end of the second wind turbine blade, when the first and the second wind turbine blades are arranged in the packaging system.

WO 2010/125424 A1 discloses an adaptable packing apparatus for aerogenerator blades. The packaging apparatus comprises an external frame and an internal frame. The internal frame is selectively positionable relative to the external frame in at least two positions in order to allow to receive different portions of a blade. The packing apparatus further comprises at least one anchor arm pivotally coupled to the frame and selectively positionable. However, the system requires movable parts and can only provide a single support surface in fixed orientations. Accordingly, the apparatus lacks flexibility in terms of supporting different blade types.

EP 1 813 473 A2 discloses an apparatus for transporting rotor blades. The apparatus comprises a frame with a space to receive a part of the rotor blade. The apparatus further comprises one cushion selectively positionable relative to the frame in at least two different positions. However, the apparatus requires movable parts and can only provide support surfaces in fixed orientations. Accordingly, the apparatus lacks flexibility in terms of supporting different blade types.

While the aforementioned transportation and storage systems are useful for a number of transport situations, there is a need for even more flexible solutions. This applies in particular to the transport of blades of different sizes and having different lengths and chord lengths. Here, prior art systems are found to offer only limited flexibility.

It is therefore a first object of the present invention to provide a transportation and storage system for wind turbine blades which overcomes or ameliorates at least one of the disadvantages of the prior art or which provides a useful alternative.

Particularly, it is an object of the present invention to provide a more flexible transport solution that is able to accommodate for different transport situations and regulatory requirements.

It is another object of the present invention to provide a transport and storage solution that is simple and cost-efficient.

SUMMARY OF THE INVENTION

The present invention relates to a modular transportation and storage system for a wind turbine rotor blade having a longitudinal axis and comprising a root end, a root region, an airfoil region with a tip, a pressure side, a suction side and a chord line extending between a leading edge and a trailing edge, the system comprising a first and a second tip end receptacle, each tip end receptacle comprising an upwardly open tip end-receiving space for receiving a portion of the tip end of the blade and having a supporting surface for supporting the blade, a tip end frame comprising an upwardly open receptacle-receiving space for receiving any of the first and second tip end receptacles and provided with positioning means for positioning any of the first and second tip end receptacles in the tip end frame, wherein the first tip end receptacle is adapted for supporting the blade in a position in which the maximum chord line of the blade forms an angle of 0-40° with vertical, and wherein the second tip end receptacle is adapted for supporting the blade in a position in which the maximum chord line of the blade forms an angle of 45-90° with vertical.

The present inventors have found that such modular system is inexpensive and offers a high degree of flexibility allowing for transport of one or more wind turbine blades in various spatial arrangements and further allows the system to be quickly modified for transport of different types of blades without having to change the outer frame of the tip end frame. This applies particularly where blades of different chord lengths must be transported or stored. If a given chord length is too high to allow for substantially vertical arrangement in the first tip end receptacle, such blade may be transported or stored substantially horizontally in the second tip end receptacle—using the same tip end transport frame and the same root end transport frame.

It is recognised that the system may comprise a plurality of different first tip end receptacles, e.g. for different blade types for transport in a substantially vertical orientation. It is also recognised that the system may comprise a plurality of different second tip end receptacles, e.g. for different blade types for transport in a substantially horizontal orientation. Thus, the system has the advantage that tip end frames that have previously been used for one or more blade types may be reused for new blade types, which avoids investment in new equipment.

The first tip end receptacle(s) are advantageously adapted for supporting blades of a first length range, e.g. 30-50 metres. The second tip end receptacle(s) are advantageously adapted for supporting blades of a second length range, e.g. 40-70 metres. The second length range is preferably a higher length range than the first length range.

The tip end frame is advantageously designed so that the first end receptacle(s) and the second end receptacle(s) are arranged in a distance, i.e. with a spacing, from a lower part of the tip end frame The term tip end is to be understood as a point of the outer 50% of the length of the blade as seen from the root end. However, in most cases the tip end receptacle is arranged at a point of the outer 30% of the length of the blade.

Since the modular system comprises two different tip end receptacles and a tip end frame, it is possible to store and transport a blade using only a tip end receptacle or by a tip end receptacle being received in the tip end frame. Thus, the blade may be stored at the production facility and at the wind turbine power plant merely by means of a tip end receptacle, thereby facilitating the handling of the blade, as the tip end frame is more bulky and heavy than the tip end receptacle. Correspondingly, the blade may be transported on the platform of a truck merely by using the tip end receptacle. On the other hand, the blade may be transported by using both the tip end receptacle and the tip end frame when transported by train or ship.

It should further be noted that the supporting surface of the tip end receptacles may be made of a flexible material being able to at least partially adapt to the surface of the blade. Alternatively, the supporting surfaces may be shaped so as to conform to the surface of the blade, thereby supporting a large part of the blade and alleviating loads. The tip end receptacles can be custom made to support specific blade types.

In a preferred embodiment, the first tip end receptacle has a lower surface allowing the first tip end receptacle to rest upright on a substantially horizontal surface, such as the ground.

In another embodiment, the first tip end receptacle has releasable retaining means for releasably retaining the tip end of the blade in the receiving space of the first tip end receptacle.

According to a preferred embodiment of the modular system, the tip end frame has retaining means for releasably retaining the tip end of the blade in the receiving space of the second tip end receptacle. Such retaining means of the tip end frame may include a pivoting arm attached to the tip end frame for pressing on a surface of the blade for fastening the same in the second tip end receptacle.

Since the system is modular, it is clear that the first and the second tip end receptacle are exchangeable in the tip end frame. It is also clear that only one of the first and the second tip end receptacles are used at a time in the tip end frame. Further, the tip end receptacle may advantageously be positioned in a fixed position relative to the tip end frame.

In another embodiment, the first tip end receptacle is adapted for supporting the blade in a position in which the maximum chord line forms an angle of 0-25° with vertical, and wherein the second tip end receptacle is adapted for supporting the blade in a position in which the maximum chord line forms an angle of 65-90° with vertical. Preferably, the first tip end receptacle is adapted for supporting the blade in a position in which the maximum chord line forms an angle of 10-25° with vertical. The second tip end receptacle may be adapted for supporting the blade in a position in which the maximum chord line forms an angle of 70-85° with vertical.

Advantageously, the tip end frame comprises a first lateral frame part and a second lateral frame part being laterally spaced apart and being mutually rigidly connected by means of transversely extending and interspaced transverse frame parts being upwardly open so as not to interfere with a blade arranged in a tip end receptacle received in the receptacle-receiving space of the tip end frame, and a base part defining a bottom surface allowing the first tip end frame to rest upright on a substantially horizontal surface, such as the ground.

In a preferred embodiment, the supporting surface of each tip end receptacle is shaped so as to at least partly conform to a surface contour of the blade. Thereby the load can be distributed on the blade to a relatively large area.

In another embodiment, the supporting surface of the first tip end receptacle is shaped so as to support a portion of the leading edge and/or trailing edge and an adjacent portion of the suction side and/or an adjacent portion of the pressure side of the blade. As wind turbine blades generally have larger stiffness in the edge-wise direction, i.e. the direction between the leading and trailing edge than in the flap-wise direction, i.e. the direction perpendicular to the edgewise direction, it is advantageous that the blade rests at least partly on the trailing or the leading edge. In other words, it is advantageous that the supporting surface of the first tip end receptacle is shaped so that the edge-wise direction of the blade forms an angle of between 5-40° with vertical, alternatively of between 10-30° with vertical.

Typically, the supporting surface of each tip end receptacle is made of a material preventing scratching of the surface of the blade. The non-scratching supporting surface can be formed of a wood material, a rubber material, a textile material or a polymer material, e.g. a foamed polymer, such as foamed polyurethane. The foamed polymer may comprise an outer coated layer, such as a granulate rubber layer. This adds strength to the foam block and further ensures that water may be drained away.

The first tip end receptacle advantageously has a rectangular outline with a pair of opposite lateral faces and a pair of opposite transversely extending transverse faces. Thereby, at least lower portions of said lateral and transverse faces of the first tip end receptacle form positioning means adapted to interact with the positioning means of the receptacle-receiving space of the tip end frame so as to position the first receptacle in the tip end frame. In this respect, it should be noted that the receptacle-receiving space of the tip end frame advantageously may be defined by elements defining a shape corresponding to the rectangular outline of the first tip end receptacle.

In a preferred embodiment, the first tip end receptacle comprises an upwardly open, box-shaped rigid structure in which is accommodated a block of material, said block forming the tip end supporting surface of the tip end-receiving space. It is preferred that the supporting surface of the block extends above or beyond the upper edges of the box-shaped structure to keep the surface of the blade received in the receiving space away from said edges.

The block may be a block of non-scratching material, such as a block of a rubber material, a wood material or a polymer material, e.g. a foamed polymer material, such as foamed polyurethane. The block may be removably received in the box-shaped structure. As a result, it is possible to use the box-shaped structure for blocks having a supporting surface of different shapes, said shapes being adapted to different blades.

It is preferred that the second tip end receptacle comprises an upwardly open, wedge-shaped, rigid structure with two opposing faces tapering towards a lower edge. The two opposing faces and the lower edge may be received within the receiving space of the tip end frame. The second tip end receptacle may be supported by one or more oblique bars of the tip end frame. Advantageously, a block is received in the interior of the wedge-shaped structure of the second tip end receptacle and an upper surface of the block is shaped to form an upwardly open tip-receiving space with a tip end-supporting surface to at least partly follow the surface contour of the tip end lying substantially horizontally on said surface, i.e. in a position in which the maximum chord line forms an angle of 45-90°, such as 70-85°, with vertical. The second tip end receptacle can thus be removed from the tip end frame and turned approximately 45 degrees so as to be supported on the ground and e.g. supporting the tip end of the blade along the leading edge.

Advantageously, the tip end frame comprises lower stacking means in a base part thereof and upper stacking means at a top thereof, said lower stacking means being arranged so as to be connected with the upper stacking means by means of locking means to allow stacking of a first tip end frame on top of a second tip end frame, said lower stacking means defining at least a portion of the bottom surface of the tip end frame. The ability of stacking the tip end frames, and thereby blades received therein, is especially useful when transportation takes place by ship or train. However, stacking may be also useful at the production facility in case of lack of space.

In a preferred embodiment, the lower and the upper stacking means are standard container corners being interspaced by a distance corresponding to a standard used in transportation and/or handling of containers. It is thus possible to connect the tip end frame to standard connection devices on-board ships and trains used for transportation of containers. The stacking means, such as standard container corner, may preferably be adapted to be interlocked by means of twist locks or other types of locks being used in container transportation.

The first tip end receptacle may comprise a strap device comprising one or more straps and extending above the blade between lateral portions of the tip end receptacle. By using one or more straps the blade may be pressed firmly against the supporting surface and reliably retained in the tip end receptacle.

The strap device may also comprise a U-shaped member having two legs and being adapted to extend around the trailing or leading edge of the blade, each leg being provided with a contact member preferably provided with a surface of a non-scratching material and adapted to be in contact with the pressure side and the suction side of the blade opposite the supporting surface of the receiving space of the tip end receptacle.

Further, the strap device may comprise a contact member having a surface contour substantially following the surface contour of the trailing or leading edge thereof.

Advantageously, the strap device comprises at least one contact member preferably having a surface of a non-scratching material and being adapted to be in contact with the blade opposite the tip end-supporting surface of the receiving space of the first tip end receptacle.

It is preferred that the tip end frame comprises connecting means for releasably connecting any of the tip end receptacles with the tip end frame. The connecting means may comprise at least one strap connecting the tip end receptacle with the tip end frame.

In a preferred embodiment, the transverse frame parts of the tip end frame are longitudinally interspaced so that inwardly facing surfaces thereof provide longitudinal positioning means for the first tip end receptacle and wherein the transverse frames parts are interconnected by means of connections means, such as interspaced and preferably parallel bars forming a support for the lower surface of the first tip end receptacle and by means of interspaced bars with inwardly facing surfaces providing lateral positioning means for the first tip end receptacle. The connection means forming a support for the tip may also be a plate connected between the transverse frame parts. The above embodiment is particularly advantageous when the tip end receptacle has a rectangular outline as mentioned above.

In order to save weight, the lateral frame parts of the tip end frame may be formed as a latticework of bars. Correspondingly, the transverse frame parts of tip end frame may be formed as a latticework of bars, said bars may form triangular spaces there between to provide transverse stiffening of the tip end frame.

The tip end frame may comprise an attachable and removable top bar adapted to extend between upper portions of the lateral frame parts to provide additional lateral stiffness to the tip end frame.

Preferably, the modular system of the present invention also comprises a root end transport frame comprising a frame body and a root end plate for coupling to the root end of a wind turbine blade. The root end plate is preferably hingedly coupled to the frame body of said root end transport frame.

In a particularly preferred embodiment, the root end plate is attachable to the frame body in a plurality of rotational positions. It is particularly preferred that the root end plate is attachable to the frame body in a first rotational position such that the maximum chord line of the blade forms an angle of 0-40° with vertical, and in a second rotational position such that the maximum chord line of the blade forms an angle of 45-90° with vertical when the blade is attached to the root end plate which is in turn attached to the frame body. This allows for an easy change of orientation by changing the tip end receptacle and adapting the rotational position of the root end plate.

In another embodiment, the root end plate is attachable to the root end of a wind turbine blade in a plurality of rotational positions. It is particularly preferred that the root end plate is attachable to the root end in a first rotational position such that the maximum chord line of the blade forms an angle of 0-40° with vertical, and in a second rotational position such that the maximum chord line of the blade forms an angle of 45-90° with vertical when the blade is attached to the root end plate which is in turn attached to the frame body.

In one embodiment, the root end transport frame may comprise a root end fixture and a frame body, said root end fixture adapted to be temporarily received in the frame body and comprising longitudinal positioning means for longitudinally positioning the root end fixture relative to the root end of the blade, releasable connecting means for releasably connecting the root end fixture to the root end of the blade, and a lower surface allowing the root end fixture to rest on a substantially horizontal surface, such as the ground, said frame body comprising positioning means for positioning the root end fixture relative to the frame body, and a lower base part defining a bottom surface allowing the frame body to rest on a substantially horizontal surface, such as the ground. Such root end transport frame may correspond to the root frame assembly described in WO 2012/019895 A1 on pages 7-8, 12-14 and FIGS. 6-8, which is incorporated herein by reference.

Preferably, the root end fixture allows connecting the root end of the blade in a plurality of rotational positions. In particular, the root end fixture may allow connecting the root end of the blade in a first rotational position such that the maximum chord line of the blade forms an angle of 0-40° with vertical, and in a second rotational position in which the maximum chord line of the blade forms an angle of 45-90° with vertical when the root end fixture is received in the frame body.

The longitudinal positioning means of the root end fixture may comprise at least one plate having at least two through-going openings adapted to receive connecting members adapted to be connected with mating connecting elements in the root end, such as bolts adapted to be connected with threaded bushings in the root end.

In a preferred embodiment of the root end transport frame, the frame body comprises an upwardly open root end fixture-receiving space for receiving a lower portion of the root end fixture, said receiving space being defined by mutually facing surfaces of lateral transversely interspaced frame parts and mutually facing surfaces of longitudinally interspaced frame parts, said mutually facing surfaces of the transversely interspaced and longitudinally interspaced frame parts, respectively, forming the positioning means of the frame body cooperating with corresponding outer surfaces of the root end fixture for positioning the root end fixture relative to the frame body. Thus, it is possible to lower the root end fixture into the root end fixture-receiving space and position the root end fixture in the frame body.

In another embodiment of the root end transport frame, the frame body of the root end transport frame comprises lower stacking means at a bottom surface thereof and upper stacking means at a top thereof, said lower stacking means arranged so as to be connected with the upper stacking means to allow stacking of a first frame body on top of a second frame body, said lower stacking means defining at least a portion of the bottom surface of the frame body, allowing the frame body to rest on a substantially horizontal surface, such as the ground. Allowing stacking of frame bodies and thereby of blades received therein, is—as indicated above—advantageous when transportation takes place by ship or train or in case of limited storage space at the production facility.

It is recognised that the idea of using drainage channels in the supporting surface of a tip end receptacle is generic in nature. Accordingly, the invention in another aspect provides a tip end receptacle comprising
a first and a second tip end receptacle (112, 160), each tip end receptacle comprising an upwardly open tip end receiving space for receiving a portion of the tip end of the blade and having a supporting surface (123, 169) for supporting the blade, Advantageously, the lower and upper stacking means of the frame body may be standard container corners being interspaced by a distance corresponding to a standard used in transportation and/or handling of containers. Further, the stacking means, such as standard container corners, of the frame body may advantageously be adapted to be interlocked by means of locking means, such as twist locks or other types of locks used in connection with containers.

The root end frame may be formed as a latticework of bars. Correspondingly, the root end fixture may be formed as a latticework of bars.

In another embodiment, at least one of the first and a second tip end receptacle are provided with one or more drainage channels formed in the supporting surface thereof. Thereby, water that may accumulate between the blade and the supporting surface of the receptacle may be drained away. Thereby, it is ensured that a film of water is not formed between the blade and the receptacle. Further, it is ensured that the friction remains sufficient to maintain a frictional bond between the receptacle and the blade. The drainage channels may for instance be formed at most in 25%, or at most 20% or at most 15% of the supporting surface. Thereby, it is ensured that a large support and friction surface is formed between the blade and the supporting surface of the receptacle. The one or more drainage channels are configured to communicate with a drainage bore. The drainage bore may be configured to drain water to a surface opposing the supporting surface.

It is recognised that the idea of providing drainage channels in the supporting surface of a receptacle is generic in nature. Accordingly, the invention also provides a tip end receptacle comprising an upwardly open tip end receiving space for receiving a portion of the tip end of the blade and having a supporting surface for supporting the blade, wherein the tip end receptacle is provided with one or more drainage channels formed in the supporting surface thereof. The tip end receptacle may be configured to be mounted in a tip end frame. The tip end receptacle may be configured according to any of the afore-mentioned or following embodiments.

In another embodiment of the modular system, each root end transport frame has a height, a width, and a depth, wherein the width of said root end transport frame is equal to or greater than the bolt circle diameter of a wind turbine blade to be supported by said root end transport frame.

In another embodiment of the modular system, each root end transport frame has a height, a width, and a depth, wherein the depth of said root end transport frame is equal to or greater than one quarter of the width of the root end transport frame.

In another embodiment of the modular system, each root end transport frame comprises: a frame body and a root end plate for coupling to the root end of a wind turbine blade, wherein said root end plate is hingedly coupled to said frame body.

In another embodiment of the modular system said root end plate is hingedly coupled to the frame body of said root end transport frame along the horizontal axis.

In another embodiment of the modular system said root end plate is hingedly coupled to the frame body of said root end transport frame along the vertical axis. In another embodiment of the modular system said root end plate is mounted on at least one bracket arm, said at least one arm coupled to said root end transport frame via a hinged joint. In another embodiment of the modular system said at least one bracket arm comprises an articulated bracket.

In another embodiment of the modular system, said root end transport frame comprises at least a first and a second bracket arm, wherein said first and second bracket arms are positioned on opposed sides of a notional central longitudinal axis of a wind turbine blade to be mounted to said root end plate.

In another embodiment of the modular system a wind turbine blade to be supported by the modular system has a longitudinal length L, and wherein the tip end transport frame is arranged to be positioned at a distance F from the root end of said blade, wherein (0.5 L)<F<(0.95 L), preferably (0.6 L)<F<(0.85 L).

According to an advantageous embodiment, the first wind turbine blade and the second wind turbine blade are stacked on top of each other, i.e. so that the second wind turbine blade is arranged above the first wind turbine blade. In a preferred embodiment, the blades are arranged so that an upwind side (or pressure side) of the blade is facing substantially downwards.

According to an alternative embodiment, the first wind turbine blade and the second wind turbine blade are stacked side-by-side. In a stacking system for storing more than two blades, it is also possible to stack the blades both horizontally and vertically, i.e. in a stacked array.

Typically, the wind turbine blades will have a length of at least 40 metres, or at least 45 metres, or even at least 50 metres. The blades may be prebent so that, when mounted on an upwind configured horizontal wind turbine in a nonloaded state, they will curve forward out of the rotor plane so that the tip to tower clearance is increased.

The first and the second wind turbine blades may be prebent. Such prebent blades may be arranged in the tip end frames and root end frames so that they are straightened slightly or fully during transport, e.g. as shown in WO05005286 by the present applicant. However, the blades need not forcedly be straightened. Since the blades are supported near the ends and the blades are arranged with the upwind side (or pressure side) facing downwards, the own weight of the blade may straighten the blades due to the gravitational forces acting on the middle part of the blade.

The first tip end receptacle may for instance support the pressure side of the blade or alternatively the leading edge of the blade. The second receptacle may support the suction side of the blade or even the trailing edge of the blade. The frames themselves may be used as lifting tools so that two or more blades may be lifted in one go and without imposing stress to the blades.

In another embodiment, intermediate protection members are arranged between the first wind turbine blade and the second wind turbine blade. Advantageously, the intermediate protection members are arranged near the tip end frames so as to provide additional support to a tip end section of the wind turbine blade. The protection means prevent the blades from being damaged due to bending or the blades impacting each other. The intermediate protection members are particularly advantageous, when the blades are stacked on top of each other. The intermediate protection members may be made of a foamed polymer.

There is also provided a root end transport frame for a wind turbine blade, the blade having a tip end and a root end, the transport frame comprising:
 a frame body; and
 a root end plate for coupling to the root end of a wind turbine blade, wherein said root end plate is hingedly coupled to said frame body.

By providing a hinged root plate, any bending moments due to blade deflection or bending are prevented from being transferred to the frame body. Accordingly, the frame body may be of a relatively lighter construction, as it does not need to bear such relatively large forces.

Preferably, said root plate is hingedly coupled to said frame body along the horizontal axis. As the angle to the vertical made by the root end of a blade may depend on factors such as the centre of gravity of the blade and the blade bending properties, accordingly the ability for the root plate to hinge along the horizontal axis allows for different angles of the blade root end to be accommodated by the frame.

Additionally or alternatively, said root plate is hingedly coupled to said frame body along the vertical axis. The hinging of the root plate around the vertical prevents damage to the transport frame due to misalignment or handling issues.

Preferably, said root end plate is mounted on at least one bracket arm, said at least one arm coupled to said transport frame via a hinged joint. Preferably, said at least one bracket arm comprises an articulated bracket. The use of an articulated bracket allows for greater degrees of freedom of manipulation of the root plate, to more easily receive and accommodate the root end of a wind turbine blade on the transport frame.

Preferably, said transport frame comprises at least a first and a second bracket arm, wherein said first and second bracket arms are positioned on opposed sides of a notional central longitudinal axis of a wind turbine blade to be mounted to said root end plate.

By positioning the bracket arms on either side of the centre point of the blade root end, the take up of forces from the root end of the blade is balanced in the transport frame.

Preferably, a wind turbine blade to be supported by the transport system has a longitudinal length L, wherein the first or second tip end transport frame is arranged to be positioned at a distance F from the root end of said blade, wherein (0.5 L)<F<(0.95 L), preferably (0.6 L)<F<(0.85 L).

Supporting the tip portion of the wind turbine blade at such a location in the outboard portion of the blade, spaced from the tip end, provides a balance between effectively structurally supporting the blade, while reducing the minimum effective wheelbase or support surface needed to support the total transport system.

As used herein, the term "chord line" means a straight line connecting the leading and the trailing edges of the airfoil. The maximum chord line is the longest chord line of a given wind turbine blade. If an airfoil has more than one chord line with maximum length, the term "maximum chord line" refers to any one of such maximum chord lines.

As used herein, the term "vertical" refers to a direction perpendicular to the ground surface such as a road surface. An "angle with vertical" means the smallest angle formed between the maximum chord of the blade, i.e. the edge-wise orientation, and the vertical axis. Accordingly, such angle is between 0-90° for all possible orientations of the wind turbine blade during transport and storage.

It will be understood that any of the above-described features may be combined in any embodiment of the transport system as described.

DETAILED DESCRIPTION OF THE INVENTION

Figure 2:
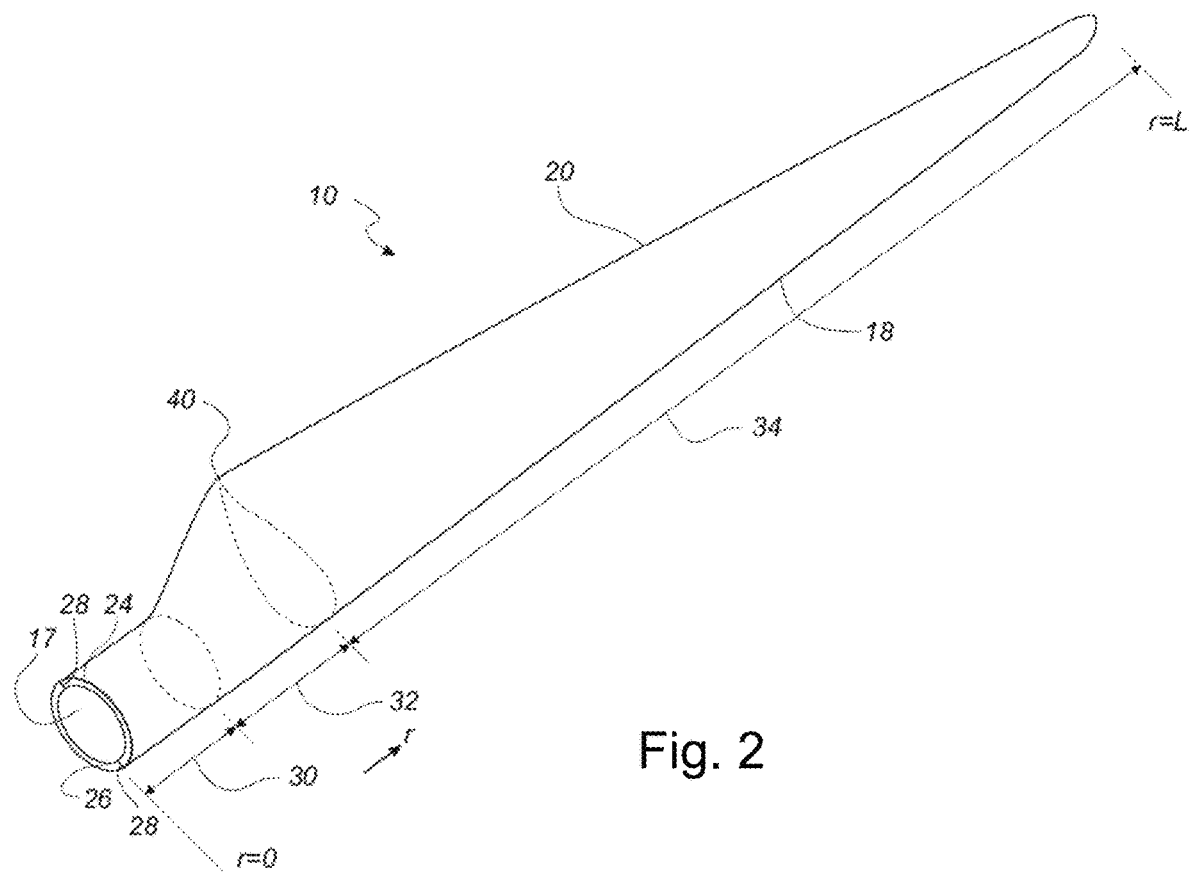
Figure 3:
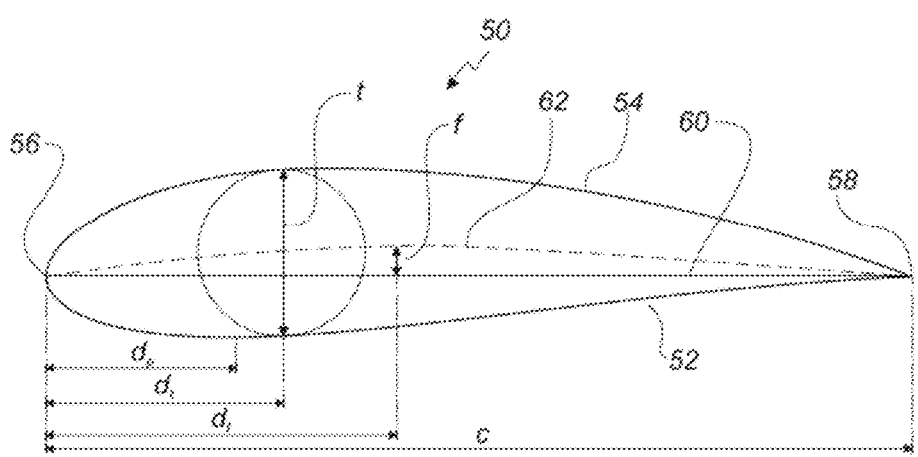
Figure 4:
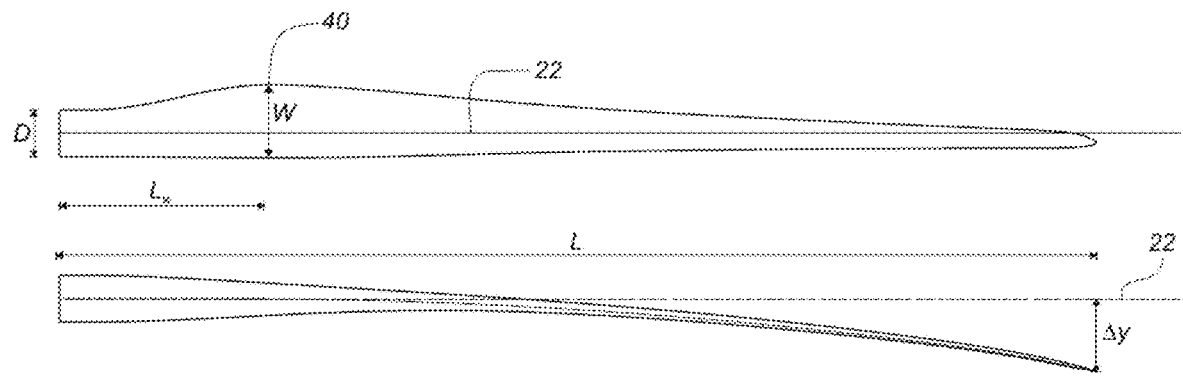
Figure 5:
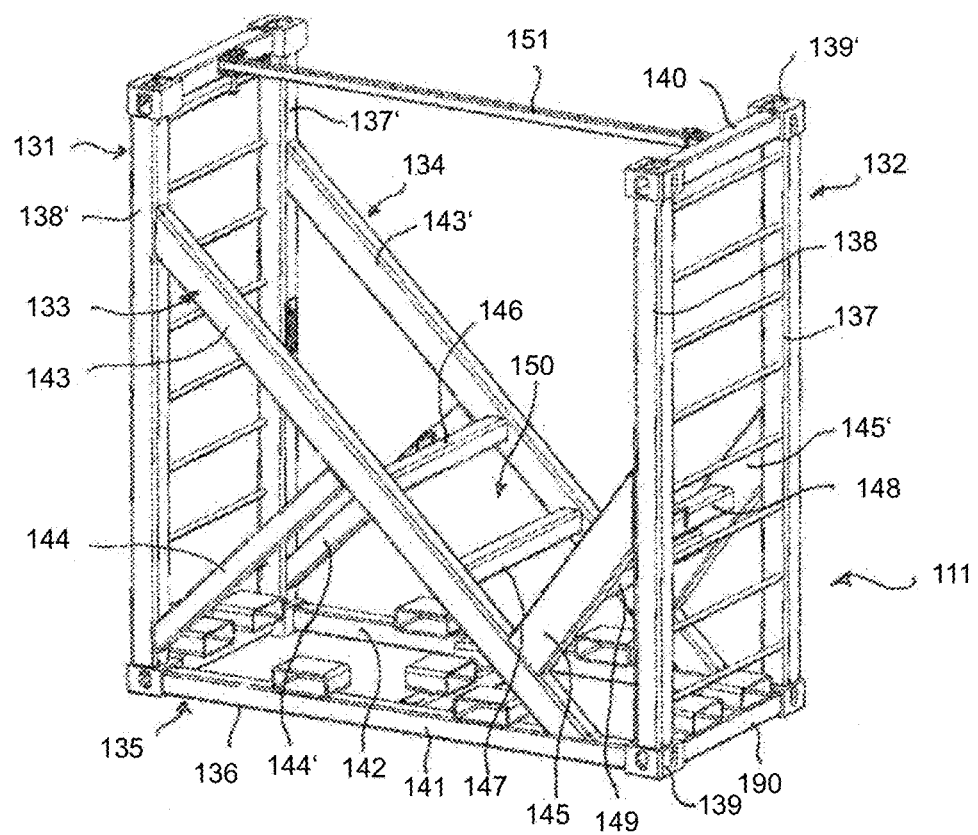
Figure 6:
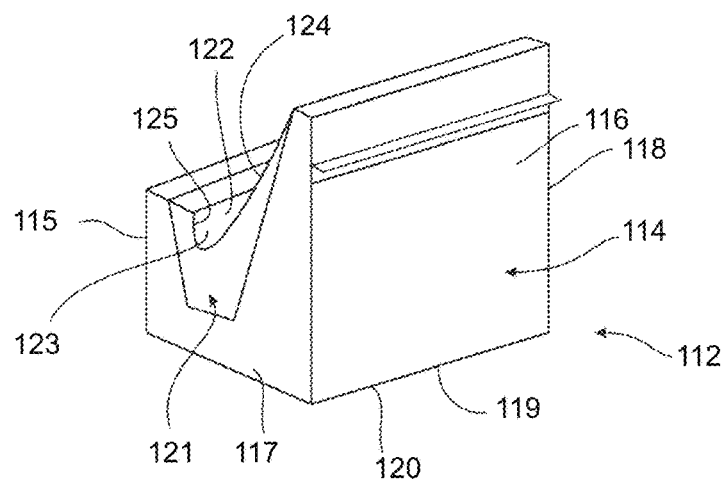
Figure 7:
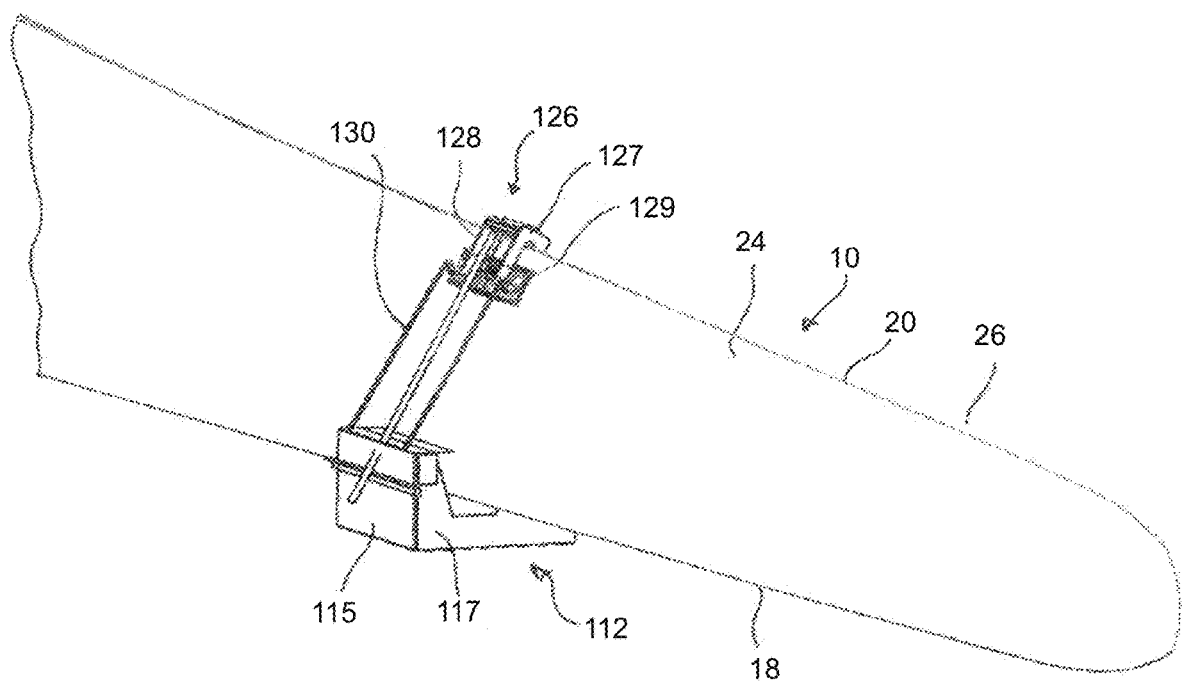
Figure 8:
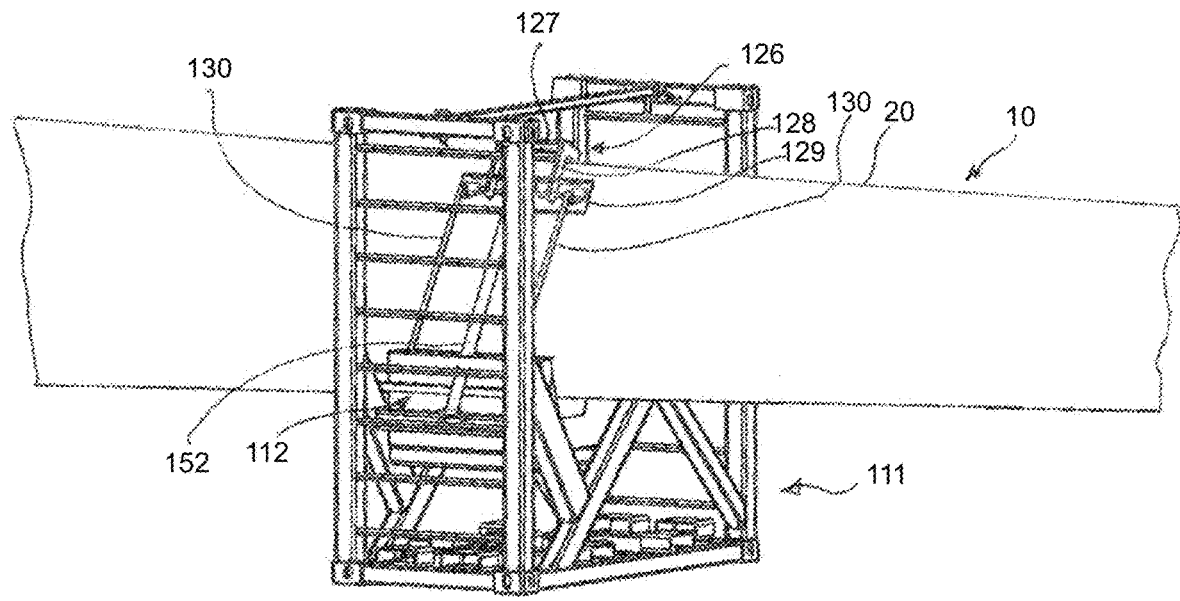
Figure 9:
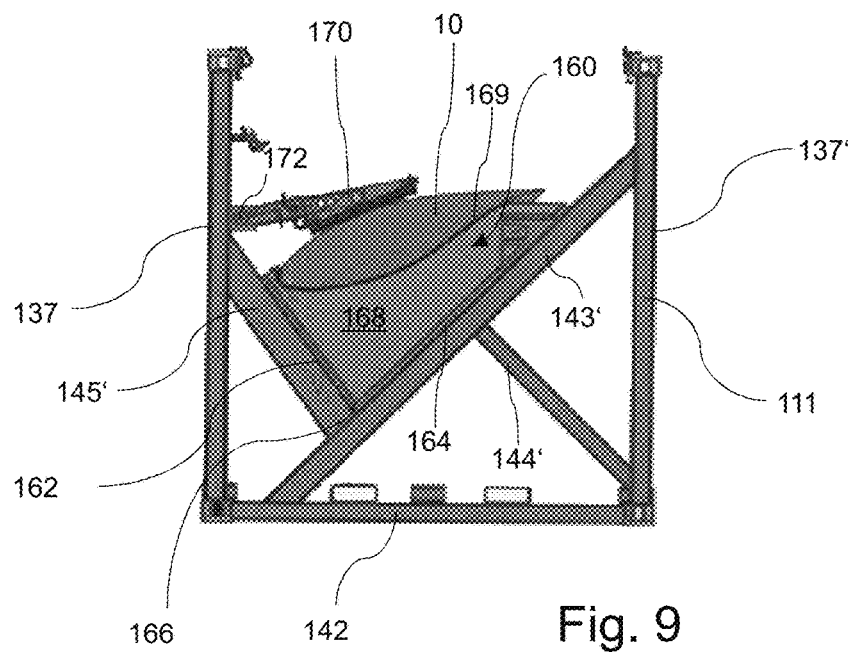
Figure 10:
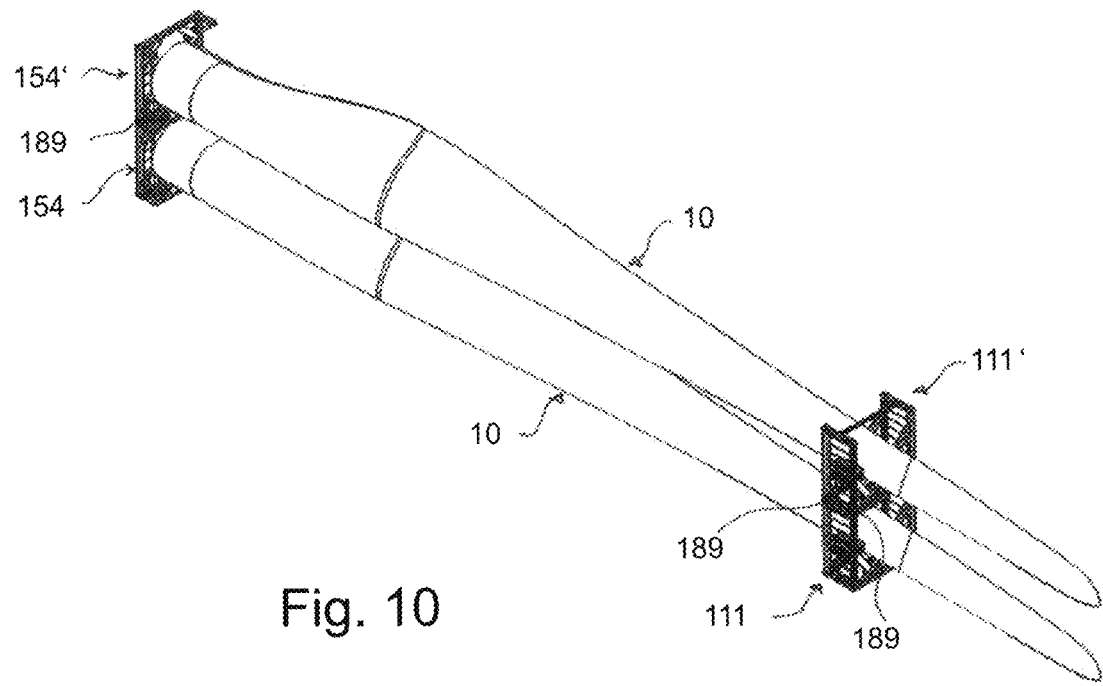
Figure 11:
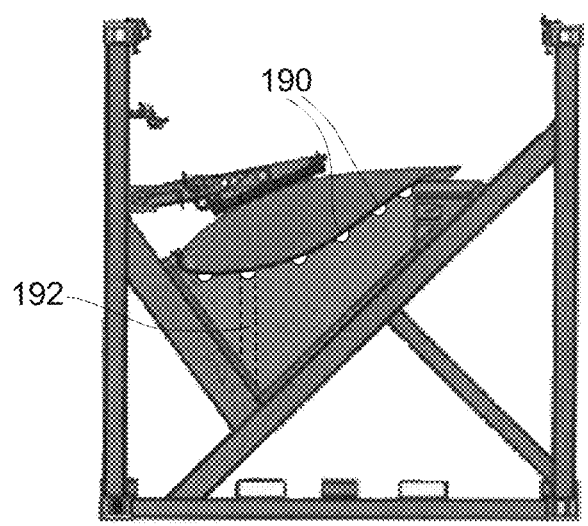

The invention is explained in detail below with reference to embodiments shown in the drawings, in which FIG. 1 shows a wind turbine, FIG. 2 shows a schematic view of a wind turbine blade according to the invention, FIG. 3 shows a schematic view of an airfoil profile, FIG. 4 shows a schematic view of the wind turbine blade according to an embodiment of the invention, seen from above and from the side, FIG. 5 is a perspective view of a tip end frame, FIG. 6 is a perspective view of a first tip end receptacle, FIG. 7 is a perspective view of a tip end of a blade received in the first tip end receptacle, FIG. 8 is a perspective view of a tip end received in the first tip end receptacle, which in turn is received in the tip end frame, FIG. 9 is a schematic cross-sectional view of a tip end of a blade received in a second tip end receptacle which in turn is received in the tip end frame, FIG. 10 is a perspective view of a first wind turbine blade stacked on top of a second wind turbine blade by using tip end frames with respective first tip end receptacles received therein and root end frames with root end fixtures received therein, and FIG. 11 is a schematic cross-sectional view of a tip end of a blade received in an alternative embodiment of a tip end receptacle, which in turn is received in the tip end frame.

The present invention relates to transport and storage of wind turbine blades for horizontal axis wind turbines (HAWTs).

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a shell made of fibre-reinforced polymer and is typically made as a pressure side or upwind shell part 24 and a suction side or downwind shell part 26 that are glued together along bond lines 28 extending along the trailing edge 20 and the leading edge 18 of the blade 10.

FIGS. 3 and 4 depict parameters, which are used to explain the geometry of the wind turbine blades to be stored and transported according to the invention.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord line 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord line 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord line 60 is called the camber f. The asymmetry can also be defined by use of parameters called the upper camber (or suction side camber) and lower camber (or pressure side camber), which are defined as the distances from the chord line 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position r=$L_w$, and has a shoulder width W, which equals the chord length at the shoulder 40. The diameter of the root is defined as X. Further, the blade is provided with a prebend, which is defined as Δy, which corresponds to the out of plane deflection from a pitch axis 22 of the blade.

Blades have over the time become longer and longer and may now exceed a length of 70 metres. The length of the blades as well as the shape of the blades with respect to shoulder, twist and prebending makes it increasingly difficult to transport the blades, in particular if a plurality of blades is to be transported and stored together. The shape and size of the blades also puts limitations on how closely the blades can be stored in a stacked array.

FIG. 5 shows a tip end frame 111 comprising a first lateral frame part 131 and a second lateral frame part 132 being laterally interspaced. The frame parts 131, 132 are mutually rigidly connected by means of transversely extending and interspaced transverse frame parts 133, 134. The tip end frame 111 further comprises a base part 135 defining a bottom surface 136 allowing the tip end frame 111 to rest upright on the ground.

Each of the lateral frame parts 131, 132 has a rectangular shape and comprises upright interspaced and mutually parallel bars 137, 138, 137', 138'. At their lower and upper ends each of the upright bars are provided with standard container corners 139, 139' and the upright bars 137, 138, 137', 138' are via the upper container corners 139' interconnected by means of an upper bar 140, and via the lower container corners 139 interconnected by means of a lower bar 190.

The base part 135 of the tip end frame comprises transverse lower bars 141, 142 connected to the lateral frame parts 131, 132 via the lower standard container corners 139 thereof.

Each of the transverse frame parts 133, 134 comprises a first oblique bar 143, 143' extending from an upper portion of the upright bar 138', 137' to a portion of the lower bar 141; 141 ' adjacent the lower standard container corner 139 of the opposite lateral frame part 132. A second oblique bar 144, 144' extends from about the mid-point of the first oblique bar 143 to a portion of the lower end of the upright bar of the first lateral frame part 131. Finally, a third oblique bar 145, 145' extends from a portion of the lower end of the first oblique bar to about a mid-point of the upright bar of a second lateral frame part 132. The first oblique bars 143, 143' are connected by means of a first upper connection bar 146 and a first lower connection bar 147. Correspondingly, the third oblique bars 145, 145' are interconnected by means of a second upper connection bar 148 and a second lower connection bar 149. The first upper connection bar 146 and the second upper connection bar 148 are arranged at the same level and are mutually parallel. Correspondingly, the first lower connection bar 147 and the second lower connection bar 149 are arranged at the same level and are mutually parallel. The first upper connection bar 146 and the second upper connection bar 148 are interspaced such that the distance between the inner surfaces thereof essentially corresponds to the distance between the pair lateral faces 115, 116 of the box-shaped, rigid structure 114. The first oblique bars 143, 143' are interspaced such that the inwardly facing surfaces thereof are mutually spaced apart at a distance essentially corresponding to the distance between the transverse faces 117, 118 of the box-shaped, rigid structure 114. The upper faces of the first and the second lower connection bars 147, 149 provide a support for the lower surface of the tip end receptacle 112. Jointly with the upper connection bars 146, 148 and portions of the first oblique bars 143, 143' and the third oblique bars 145, 145', the lower connection bars 147,149 define an upwardly open receptacle-receiving space 150 for receiving the receptacle 112.

Additionally, inner faces of the first oblique bars and the third oblique bars and the upper connection bars form positioning means adapted to cooperate with the outer faces 115, 116; 117, 118 of the box-shaped, rigid structure 114 of the tip end receptacle 112 to position the receptacle 112 when it is lowered into the receptacle-receiving space 150 of the tip end frame.

Further, the tip end frame 111 comprises an attachable and removable top bar 151 adapted to extend between upper portions of the lateral frame parts 131, 132 to provide additional lateral stiffness to the tip end frame. The top bar 151 is attached after the receptacle has been received in the receptacle-receiving space 150.

It should further be mentioned that the tip end frame 111 comprises connection means for releasably connecting the tip end receptacle to the tip end frame.

As seen in FIG. 6, the first tip end receptacle 112 comprises an upwardly open, box-shaped, rigid structure 114 formed of sheet metal and having a rectangular outline with a pair of opposite lateral faces 115, 116, the lateral face 116 being higher than the lateral face 115, and a pair of opposite transversely extending transverse faces 117, 118. The box-shaped structure 114 further comprises a planar bottom 119 having a lower surface 120 allowing the box-shaped structure to rest upright on a substantially horizontal surface, such as the ground. A block 121 is received in the interior of the box-shaped structure and an upper surface of the block 121 is shaped to form an upwardly open tip-receiving space 122 defined by a tip end-supporting surface 123. The tip end-supporting surface 123 is shaped to at least partly follow the surface contour of the tip end at the point thereof, where the tip end is intended to be support by the tip end-supporting surface 123.

More specifically, the tip end-supporting surface 123 is shaped to support the leading edge 18 of the blade 10 and adjacent portions of the suction side 26 and pressure side 24 of the blade 10. The portion 124 of the supporting surface 123 supporting the suction side 26 is larger than the portion 125 of the supporting surface 123 supporting the pressure side 24 of the blade 10.

The supporting surface 123 is shaped to support the blade 10 so that the chord or the edge-wise direction of the blade forms an acute angle with vertical. Said angle is between 0-40°, preferably between 10-30°.

The block 121 or at least the supporting surface 123 thereof is formed of a material preventing scratching of the surface of the blade, such as a wood material, a rubber material, textile material or a polymer material, e.g. a foamed polymer, such as foamed polyurethane. In its entirety, the block 121 may be formed of a foamed polymer, such as foamed polyurethane or a rubber material.

The first tip end receptacle 112 further comprises retaining means for retaining the tip end of the blade in the receiving space 122. As seen in FIG. 7, the retaining means may be formed of a strap device 126 comprising a U-shaped member 127 having two legs of which only one 128 is visible. The U-shaped member is also adapted to extend around the trailing edge 20 of the blade 10. Each leg 128 is provided with a contact member of which only one 129 is visible. Each contact member 129 is provided with a surface of a non-scratching material and adapted to be in contact with the pressure side 24 and the suction side 26 of the blade 10 opposite the supporting surface 124. The strap device 126 is further provided with straps 130 extending between the contact member 129 and the adjacent outer lateral wall of the box-shaped, rigid structure 114. By tightening the straps 130 the tip end of the blade is pressed against the supporting surface 123 and thus reliably retained in the first tip end receptacle 112.

As shown in FIG. 8, the connection means may be formed of one or more straps 152 extending between the strap device 126 and the adjacent upper connection bar 146, 148 of the tip end frame 111.

FIG. 9 shows a second tip end receptacle 160 mounted in a tip end frame 111 and receiving the tip end of a wind turbine blade 10. The second tip end receptacle 160 comprises an upwardly open, wedge-shaped, rigid structure with two opposing faces 162, 164 tapering towards a lower edge 166. The two opposing faces 162, 164 and the lower edge 166 are received within the corresponding space of the tip end frame 111 formed by the oblique bars 143, 143', 145, 145'. A block 168 is received in the interior of the wedge-shaped structure and an upper surface of the block 168 is shaped to form an upwardly open tip-receiving space with a tip end-supporting surface 169 to at least partly follow the surface contour of the tip end lying substantially horizontally on said surface, i.e. in a position in which the maximum chord line forms an angle of 45-90° with vertical. In the embodiment shown in FIG. 9, the tip end frame 111 also comprises a pivoting arm 170 hingedly attached to a connection point 172 in the frame for pressing on the opposing surface of the blade for fastening the same in the second tip end receptacle 160.

FIG. 10 illustrates that root end frames and tip end frames with wind turbine blades attached thereto can be stacked on top of each other by using twist locks 189 to connect the upper standard container corners of the frame body 154 of the lower root end frame with the lower standard container corners of the frame body 154' of the upper root end frame and likewise the lower tip end frame 111 to the upper tip end frame 111'. In FIG. 10, both tip end frames receive a first tip end receptacle to support the blades 10 substantially vertically, i.e. with a low acute angle with vertical. Although two stacks of blades are shown, it is possible to stack more than two blades.

FIG. 11 shows an embodiment similar to the one shown in FIG. 9. However, the embodiment of FIG. 11 differs by having a plurality of drainage channels 190 formed in the supporting surface of the tip end receptacle, and which are configured to remove water formed between the blade and the supporting surface. The drainage channels 190 may be oriented in the longitudinal direction, i.e. substantially parallel to the blade. But the drainage channels 190 may also be arranged in the transverse direction or for instance at an angle compared to the longitudinal direction. The drainage channels may be connected to drainage bore 192, which may more efficiently drain accumulated water away, e.g. to an opposing surface of the receptacle.

LIST OF REFERENCE NUMERALS 2 wind turbine
4 tower
6 nacelle
8 hub
10 blade
14 blade tip
16 blade root
17 root end face
18 leading edge
20 trailing edge
22 pitch axis
24 pressure side shell part/upwind shell part
26 suction side shell part/downwind shell part
28 bond lines
30 root region
32 transition region
34 airfoil region
40 shoulder
50 airfoil profile
52 pressure side/upwind side
54 suction side/downwind side
56 leading edge
58 trailing edge
60 chord line
62 camber line/median line
111 tip end frame
112 first tip end receptacle
114 box-shaped rigid structure
115-116 pair of lateral faces
117-118 pair of transverse faces
119 planar bottom
120 lower surface
121 block
122 tip end-receiving space
123 tip end-supporting surface
124 large portion of the supporting surface
125 small portion of the supporting surface
126 strap device
127 U-shaped member
128 leg
129 contact member
130 straps
131 first lateral frame part
132 second lateral frame part
133-134 transverse frame part
135 base part
136 bottom surface
137,137' upright bar
138,138' upright bar
139,139' standard container corner
140 upper bar
141-142 transverse lower bar
143,143'first oblique bar
144,144'second oblique bar
145,145'third oblique bar
146 first upper connection bar
147 first lower connection bar
148 second upper connection bar
149 second lower connection bar
150 receptacle-receiving space
151 top bar
152 strap
154,154'root end frame body
160 second tip end receptacle
162 first lower face
164 second lower face
166 lower edge
168 block
169 supporting surface 170 pivoting arm
172 connection point
189 twist lock
190 drainage channel
192 drainage bore
c chord length
$d_t$ position of maximum thickness
$d_f$ position of maximum camber
$d_p$ position of maximum pressure side camber
f camber
L blade length
r local radius, radial distance from blade root
t thickness
D blade root diameter
Δy prebend
W root end transport frame width

The invention claimed is:

1. A modular transportation and storage system for a wind turbine rotor blade (10) having a longitudinal axis and comprising a root end (17), a root region (30), an airfoil region (34) with a tip (14), a pressure side (24), a suction side (26) and a chord line (60) extending between a leading edge (18) and a trailing edge (20), the system comprising:
   first and second tip end receptacles (112, 160), each of the first and second tip end receptacles comprising an upwardly open tip end receiving space for receiving a portion of the tip end of the wind turbine rotor blade and having a supporting surface (123, 169) for supporting the wind turbine rotor blade; and
   a tip end frame (111) comprising an upwardly open receptacle-receiving space (150) for receiving any of the first and second tip end receptacles and provided with positioning means for positioning any of the first and second tip end receptacles (112, 160) in the tip end frame,
   wherein the first tip end receptacle (112) is adapted for supporting the wind turbine rotor blade (10) in a position in which the maximum chord line (60) of the wind turbine rotor blade (10) forms an angle of 0-40° with vertical, and wherein the second tip end receptacle (160) is adapted for supporting the wind turbine rotor blade in a position in which the maximum chord line (60) of the blade (10) forms an angle of 45-90° with vertical.

2. The modular transportation and storage system for a wind turbine rotor blade (10) according to claim 1, wherein the system is configured so that the first tip end receptacle and the second tip end receptacle are exchangeable in the tip end frame.

3. The modular transportation and storage system for a wind turbine rotor blade (10) according to claim 2, wherein the first tip end receptacle is adapted for supporting the wind turbine rotor blade in a position in which the maximum chord line forms an angle of 0-25° with vertical, and wherein the second tip end receptacle is adapted for supporting the wind turbine rotor blade in a position in which the maximum chord line forms an angle of 65-90° with vertical.

4. The modular transportation and storage system for a wind turbine rotor blade (10) according to claim 1, wherein the tip end frame comprises:
   a first lateral frame part (131) and a second lateral frame part (132) being laterally spaced apart and being mutually rigidly connected by means of transversely extending and interspaced transverse frame parts (133, 134) being upwardly open so as not to interfere with a blade arranged in a tip end receptacle (112, 160) received in the receptacle-receiving space (150) of the tip end frame (111); and
   a base part (135) defining a bottom surface (136) allowing the first tip end frame to rest upright on a substantially horizontal surface, such as the ground.

5. The modular transportation and storage system for a wind turbine rotor blade (10) according to claim 1, wherein the supporting surface (123) of the first tip end receptacle (112) is shaped so as to support a portion of the leading edge (18) and/or trailing edge (20) and an adjacent portion of the suction side (26) and/or an adjacent portion of the pressure side (24) of the wind turbine rotor blade.

6. The modular transportation and storage system for a wind turbine rotor blade (10) according to claim 1, wherein the second tip end receptacle (160) comprises an upwardly open, wedge-shaped, rigid structure with two opposing faces (162, 164) tapering towards a lower edge (166).

7. The modular transportation and storage system for a wind turbine rotor blade (10) according to claim 1, wherein the tip end frame (111) comprises lower stacking means (139) in a base part thereof and upper stacking means (139') at a top thereof, said lower stacking means being arranged so as to be connected with the upper stacking means by means of locking means to allow stacking of a first tip end frame on top of a second tip end frame, said lower stacking means defining at least a portion of the bottom surface (136) of the tip end frame.

8. The modular transportation and storage system for a wind turbine rotor blade (10) according to claim 7, wherein the lower and the upper stacking means (139) are standard container corners being interspaced by a distance corresponding to a standard used in transportation and/or handling of containers.

9. The modular transportation and storage system for a wind turbine rotor blade (10) according to claim 1, wherein the first tip end receptacle comprises a strap device (126) comprising one or more straps and extending above the wind turbine rotor blade between lateral portions of the first tip end receptacle (112).

10. The modular transportation and storage system for a wind turbine rotor blade (10) according to claim 9, wherein the strap device (126) comprises at least one contact member (129) preferably having a surface of a non-scratching material and being adapted to be in contact with the wind turbine rotor blade opposite the tip end-supporting surface (123) of the receiving space (122) of the first tip end receptacle (112).

11. The modular transportation and storage system for a wind turbine rotor blade (10) according to claim 1, wherein the tip end frame (111) comprises connecting means for releasably connecting any of the tip end receptacles (112, 160) with the tip end frame.

12. The modular transportation and storage system for a wind turbine rotor blade (10) according to claim 4, wherein the transverse frame parts (133,134) of the tip end frame (111) are longitudinally interspaced so that inwardly facing surfaces thereof provide longitudinal positioning means for the first tip end receptacle (112) and wherein the transverse frames parts (133,134) are interconnected by means of connections means, such as interspaced and preferably parallel bars (147,149) forming a support for the lower surface of the first tip end receptacle (112) and by means of interspaced bars (146,148) with inwardly facing surfaces providing lateral positioning means for the first tip end receptacle.

13. The modular transportation and storage system for a wind turbine rotor blade (10) according to claim 1 further comprising a root end transport frame comprising a frame body (154) and a root end plate for coupling to the root end of the wind turbine rotor blade (10).

14. The modular transportation and storage system for a wind turbine rotor blade (10) according to claim 13, wherein the root end plate is attachable to the frame body (154) in a plurality of rotational positions.

15. The modular transportation and storage system for a wind turbine rotor blade (10) according to claim 13, wherein the root end plate is attachable to the root end of the wind turbine rotor blade (10) in a plurality of rotational positions.

16. The modular transportation and storage system for a wind turbine rotor blade (10) according to claim 13, wherein the frame body (154) of the root end transport frame comprises lower stacking means at a bottom surface thereof and upper stacking means at a top thereof, said lower stacking means arranged so as to be connected with the upper stacking means to allow stacking of a first frame body on top of a second frame body, said lower stacking means defining at least a portion of the bottom surface of the frame body, allowing the frame body to rest on a substantially horizontal surface, such as the ground.

17. The modular transportation and storage system for a wind turbine rotor blade (10) according to claim 1, wherein at least one of the first and a second tip end receptacle (112, 160) are provided with one or more drainage channels (190) formed in the supporting surface (123, 169) thereof.

18. The modular transportation and storage system for a wind turbine rotor blade (10) according to claim 17, wherein the drainage channels at most are formed in 25%, or at most 20% or at most 15% of the supporting surface (123, 169).

19. The modular transportation and storage system for a wind turbine rotor blade (10) according to claim 17, wherein the one or more drainage channels (190) are configured to communicate with drainage bore (192).

* * * * *